(12) United States Patent
Nimberger

(10) Patent No.: US 8,067,851 B2
(45) Date of Patent: Nov. 29, 2011

(54) DIFFERENTIAL PRESSURE GENERATOR

(75) Inventor: Spencer M. Nimberger, Houston, TX (US)

(73) Assignee: PGI International, Ltd., Houston, TX (US)

( * ) Notice: Subject to any disclaimer, the term of this patent is extended or adjusted under 35 U.S.C. 154(b) by 374 days.

(21) Appl. No.: 12/315,200

(22) Filed: Dec. 1, 2008

(65) Prior Publication Data

US 2010/0133834 A1 Jun. 3, 2010

(51) Int. Cl.
*H02P 9/04* (2006.01)
(52) U.S. Cl. .......................... 290/54; 290/43
(58) Field of Classification Search .............. 290/54, 290/43; 415/3.1; 166/66.5
See application file for complete search history.

(56) References Cited

U.S. PATENT DOCUMENTS

| 2,743,375 | A | 4/1956 | Parker |
| 2,984,751 | A | 5/1961 | Cliborn |
| 3,039,007 | A | 6/1962 | Williams et al. |
| 3,157,793 | A | 11/1964 | Adkins |
| 4,232,991 | A | 11/1980 | Gamell |
| 4,293,777 | A | 10/1981 | Gamell |
| 4,935,650 | A | 6/1990 | Hannan, III |
| 5,118,961 | A | 6/1992 | Gamell |
| 5,818,117 | A * | 10/1998 | Voss et al. ................ 290/40 A |
| 7,683,499 | B2 | 3/2010 | Saucier |
| 7,723,860 | B2 * | 5/2010 | Nagler ......................... 290/54 |
| 7,919,877 | B2 * | 4/2011 | Shimizu et al. ............. 290/43 |
| 2007/0246941 | A1 * | 10/2007 | Tanaka et al. ............. 290/1 R |
| 2008/0246282 | A1 * | 10/2008 | Hathaway et al. .......... 290/54 |

FOREIGN PATENT DOCUMENTS

WO WO 2007036943 A2 * 4/2007 ................ 290/54

* cited by examiner

*Primary Examiner* — Tulsidas C Patel
*Assistant Examiner* — Stefan Mikailoff
(74) *Attorney, Agent, or Firm* — Browning Bushman P.C.

(57) ABSTRACT

An electrical generator (10) powered by fluid pressure in a flow line includes a turbine housing (23) and control valve (11). The turbine housing houses a rotor (29) and a plurality of turbine blades (33) which are rotated by fluid passing from the flow line through the turbine housing. A bearing (22) within the turbine housing guides rotation of the rotor, and supports a plurality of magnets (28). Cap member (23) is sealed to the turbine housing, and a stator (40) external of the cap member generates electricity in response to a plurality of rotating magnets.

25 Claims, 4 Drawing Sheets

DIFFERENTIAL PRESSURE GENERATOR

FIELD OF THE INVENTION

The invention relates generally to an integrated turbine generator, such as used in a generator and battery charge control system, using the pressure differential typically found in natural gas production and transmission systems.

BACKGROUND OF THE INVENTION

The natural gas production and transmission industry routinely wastes significant amounts of energy that could be put to economical and environmentally friendly use for the production of electrical energy. The need for electric power at the well site, compressor stations, downstream city gate and neighborhood distribution stations is well known. Flow measurement, equipment status, valve actuation, emission control and communication systems all require different but typically small amounts of electrical energy to operate. Even when grid electric power is available, commercial electrical power may not be desirable to use due to setup and permitting costs. In these and remote situations where grid power is not available, solar panels or thermoelectric generators are typically used.

When gas comes to the surface from a well, it is often at a pressure significantly higher than pressure which may be safely placed in a transmission line. Accordingly, the gas pressure typically is regulated or choked down to the transmission line pressure limit. This pressure reduction releases large amounts of energy, typically as a cooling effect, which is wasted and in many cases has to be reversed by burning gas to reheat the cooled gas before it can continue down the pipeline. When high pressure transmission gas arrives at what is referred to as a "city gate," the pressure must again be reduced significantly before it can enter pipelines that go into the neighborhoods. Again, the "pressure" energy in the gas is typically wasted even though electric power is needed for instrumentation and communication systems at the site. At remote locations, solar power or thermoelectric systems are often used to keep batteries charged to operate the equipment.

Solar energy is essentially free power, but its production is unreliable in many parts of the world due to uncontrollable weather conditions. This unpredictability results in the solar systems being greatly oversized in both panels and battery banks to provide the required safety factor. Also, solar systems by their nature allow batteries to be deep drawn which reduce the battery life.

Thermoelectric systems operate 24/7 off the natural gas in the line so over sizing and deep drawing batteries are not a problem, although the cleanliness and quality of the gas greatly affects the operation of the systems and often requires high maintenance "gas cleaning" before it may be used to run the thermoelectric generator. This is particularly a problem at well sites where the gas has not yet been cleaned up.

A generating device which would not be weather, sunlight or gas quality dependant and which would use the previously wasted pressure differential seen at well sites and city gate stations would be useful in the industry for supplying electric power to keep battery banks at full charge regardless of weather or gas quality.

Also, industry standards applicable to equipment placed in a potentially hazardous environment require that faults in the equipment would be unlikely to cause an explosion or fire in the area even if explosive gasses were present at the time of the equipment failure. For such a requirement, isolating the electrical circuits from the potentially explosive media with fixed barriers and static seals is highly desirable.

The prior art includes a variety of turbines having integrated generators. U.S. Pat. No. 4,293,777 discloses a turbine with a hollow rotor in which are disposed the elements of an electric generator. U.S. Pat. No. 4,935,650 discloses a fluid driven rotor with spaced apart ferromagnetic discs which cooperate with cavities of a ferromagnetic stator to generate electrical power. U.S. Pat. No. 2,984,751 discloses a rotor carrying an armature element which cooperates with exteriorly mounted stationary field elements. U.S. Pat. No. 3,039,007 discloses a turbine wheel having a shaft which mounts a permanent magnet for being rotatably driven inside a stator steel core. U.S. Pat. No. 2,743,375 discloses a turbo-generator having rotating bladed discs alternating with stationary discs: each of the discs carry cooperating flat radial pole-pieces and windings. U.S. Pat. No. 3,157,793 includes stator discs circumferentially disposed about rotor discs which have magnetic poles placed about their peripheries. U.S. Pat. No. 5,118,961 discloses a hollow rotor driven on it's periphery about a stator steel core.

Prior art integrated turbines include electrical generator elements that are in the turbine media or are separated from that media by dynamic seals. Isolation of a pressurized turbine drive mechanism from a generator using a magnetic drive is possible, but magnetic drives are both expensive and subject to magnetic decoupling and runaway under load, which may destroy a bearing in short order.

The disadvantages of the prior art are overcome by the present invention, and an improved differential pressure electrical generator powered by fluid pressure in the flow line is hereinafter disclosed.

SUMMARY OF THE INVENTION

The present invention provides an integrated turbine generator which has all elements of the electrical system separated from the turbine and rotor by a static seal pressure boundary. Electrical power is generated through this boundary. This approach is simple, low cost and highly reliable. The pressurized media also does not circulate in close proximity to the rotating magnets of the generator turbine or the support bearing.

A turbine rotor is positioned in a turbine housing such that a controlled stream of fluid may impact the rotor causing the rotor to rotate. The turbine rotor is attached to a shaft which is supported by a bearing. The shaft runs through the bearing and is formed into a generator rotor assembly containing permanent magnets around its periphery.

The turbine rotor, rotor shaft and generator rotor assembly are contained in a pressure tight member which directs the fluid to the exhaust port after impinging on the rotor to cause rotation. The pressure tight member that surrounds the generator rotor assembly is constructed of a material that is transparent to a magnetic field and is generally thin in cross section and approximates a shell around the rotor assembly. The outside of the shell is brought into close proximity to a generator stator assembly such that the spinning rotor will impress its magnetic field on the stator assembly and cause an electric current to be generated in the stator windings.

The above arrangement is highly desirable because it completely isolates the electrical circuit of the generator contained in the stator assembly from the pressurized media driving the turbine rotor and the isolation is accomplished without dynamic seals. The absence of a dynamic seal removes any rotational speed restriction imposed by the presence of a dynamic seal since higher turbine speeds will wear dynamic seals faster. In addition, by not having a dynamic seal, the rotational speed of the turbine is limited only by the bearing. This arrangement allows the generator to be reliably safe even when placed directly on a gas pipeline which is the preferred location for this type of generating device since the possibility of a fluid leak caused by a seal failure is virtually eliminated.

These and further features and advantages of the present invention will become apparent from the following detailed description, wherein reference is made to the figures in the accompanying drawings.

DETAILED DESCRIPTION OF THE PREFERRED EMBODIMENTS

Figure 1:
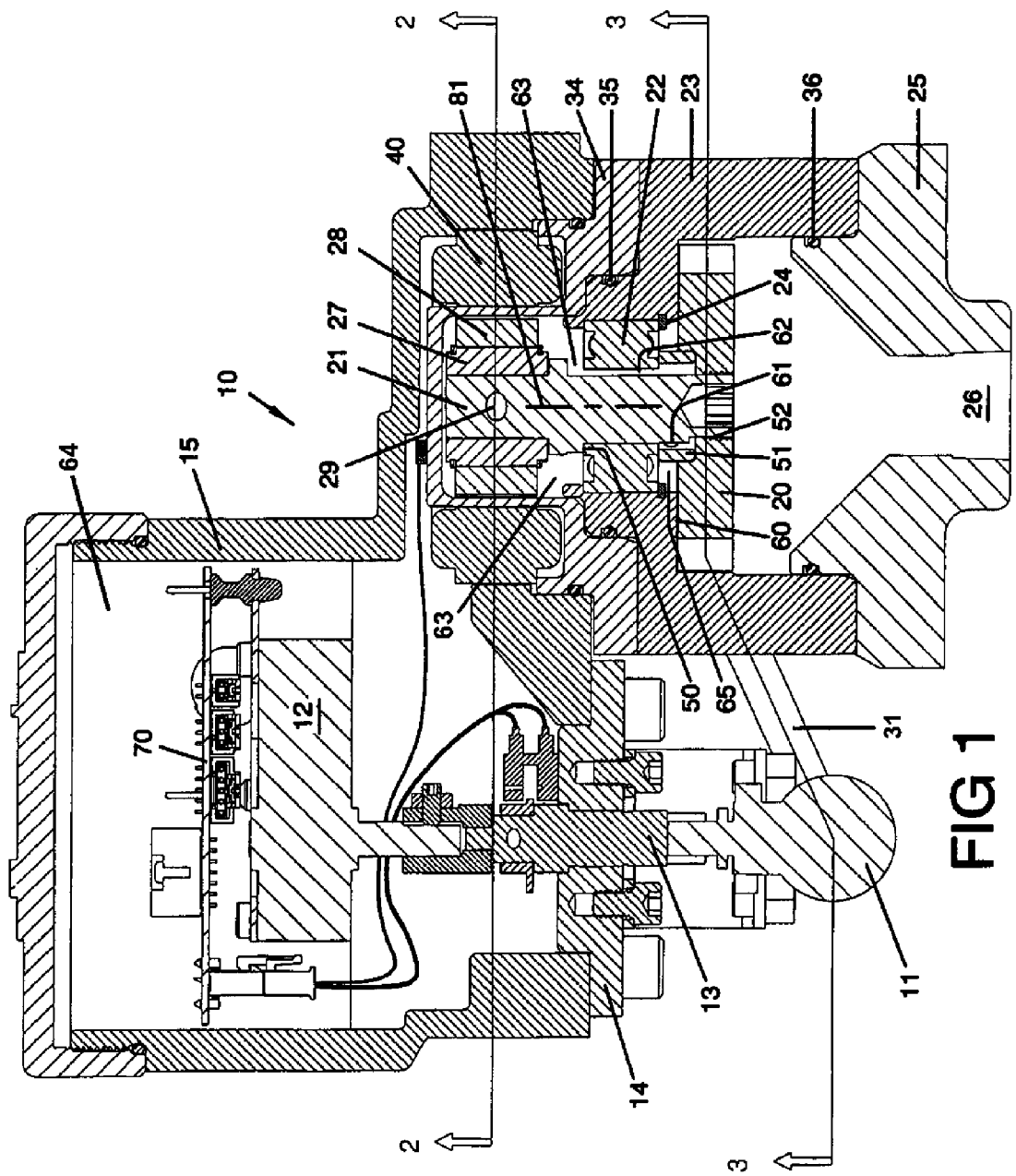
FIG. 1 shows a cross section of the integrated turbine generator.

The integrated turbine generator assembly 10 is comprised of a flow control valve 11 connected to valve control motor 12 by a motor control shaft 13. Valve 11 is mounted to mounting plate 14 attached to generator housing 15. Mounting plate 14 further supports and guides motor control shaft 13, which connects to both valve 11 and control motor 12.

Turbine rotor 20 is attached to rotor shaft 21 which is supported by bearing 22 within turbine housing 23. The inside race of bearing 22 is trapped between shoulder 50 on shaft 21 (upper surface of the bearing engages the rotor) and a sleeve shaped turbine rotor spacer 51 which is brought into contact with turbine rotor 20 when screwed onto shaft 21 at thread 52. The outside race of bearing 22 is mounted in turbine housing 23 and secured with snap ring 24 (lower surface of the bearing engages a stop axially fixed to the turbine housing). Pressure is balanced across bearing 22 as it passes through gap 60 between turbine rotor 20 and turbine housing 23. Pressure then enters cavity 65 and passes through turbine spacer 51 via drilled through port 61. Pressure may then circulate around the ID of turbine spacer 51 and exit to cavity 63 via flat 62 formed on shaft 21, thus pressure balancing the bearing. Fluid does not pass between a radially inward race and a radially outward race of the bearing. Flat 62 is one form of a fluid passageway circumferentially positioned in the shaft 21 and axially extending to provide pressurized fluid above and below the bearing. Turbine exhaust cover 25 may be attached to housing 23 by bolts not shown.

Figure 3:
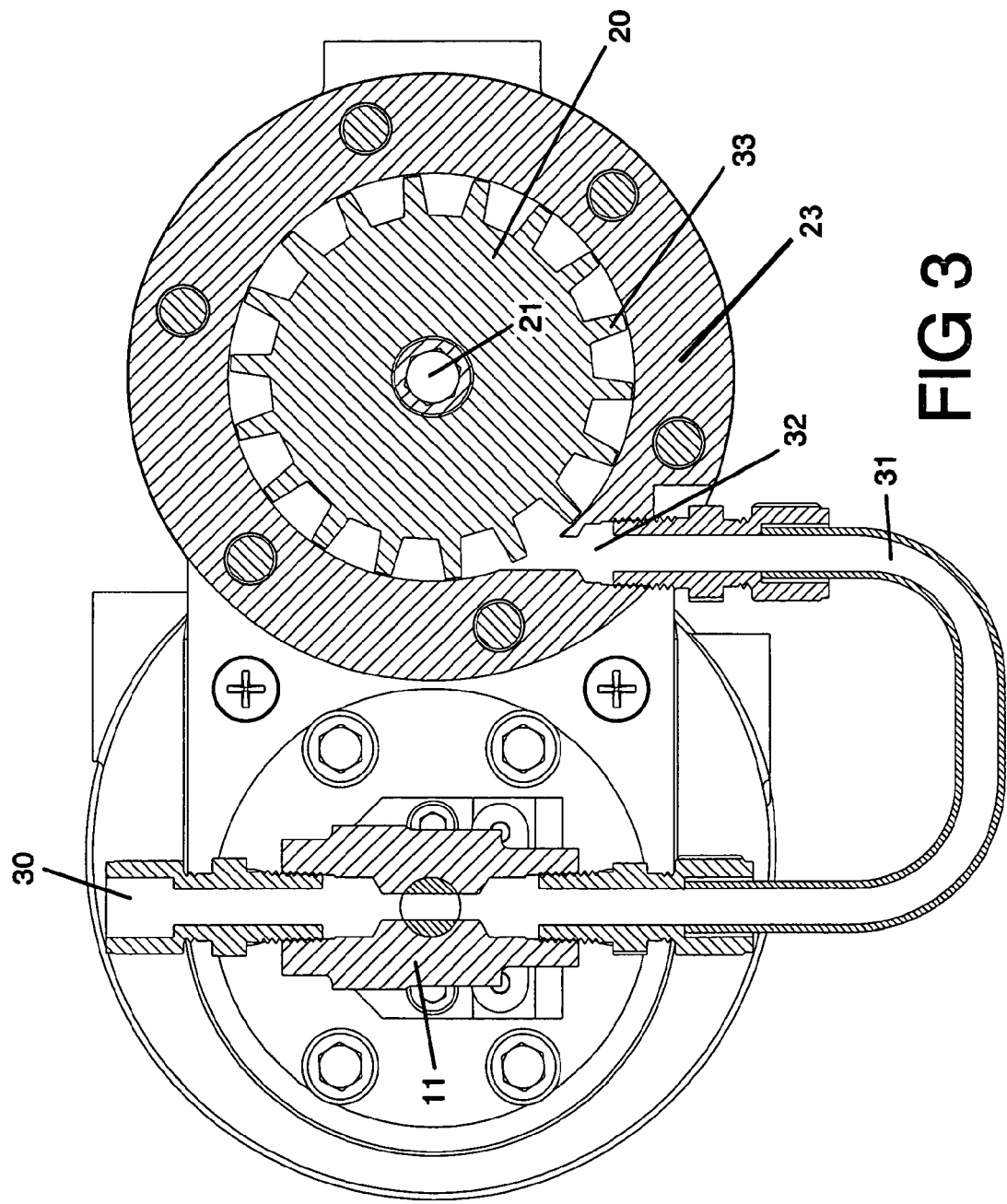
FIG. 3 is a cross section showing the generator rotor and stator.

Referring now to FIG. 3, the pressurized fluid enters the system from a pressurized fluid line at inlet port 30 and the flow is controlled by valve 11. The fluid then passes through tube 31 and enters the turbine cavity through orifice 32 to impinge on turbine blades 33 causing the turbine rotor 20 to rotate. The exhaust fluid then passes through port 26 in turbine exhaust cover 25, as shown in FIG. 1.

Figure 2:
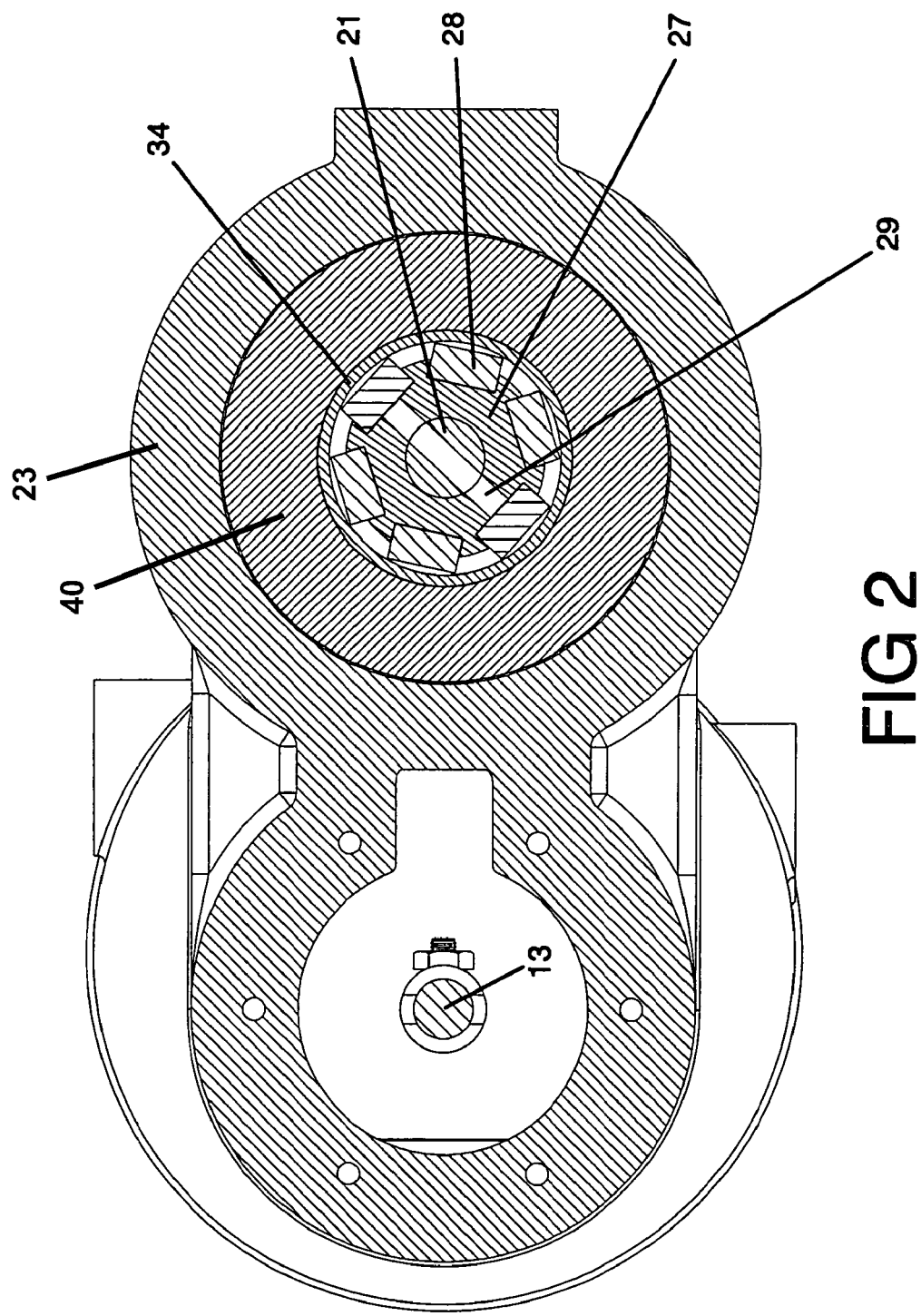
FIG. 2 is a cross section depicting the turbine and generator flow control valve.

Now referring to FIGS. 1 and 2, the rotor assembly 27 is mounted to shaft 21, which rotates about central axis 81, and is fixed to shaft 21 with pin 29. A plurality of magnets 28 are circumferentially mounted on rotor assembly 27 and come in close proximity to shell housing or cap member 34, which has a cap top or end axially opposite the turbine blades with respect to the bearing and cap sides preferably made of a material both magnetically transparent (substantially non-magnetic) and capable of containing the fluid pressure.

Shell housing 34 may be attached to turbine housing 23 with bolts (not shown) and sealed with static seal 35, such as an O-ring, to contain the fluid pressure inside the shell housing 34. Static seal 35 and seal 36 between the turbine housing 23 and the turbine exhaust cover 25 both serve to isolate the pressure cavities 63, 65 from the atmosphere and the housing cavity 64 containing the electric circuits or electronic boards 70 as shown in FIG. 1.

Generator stator 40 is mounted inside housing 15. The outside diameter of shell 34 is in close proximity to the inside diameter of generator stator 40, such that the rotating magnets on rotor assembly 27 will excite the coils of stator 40 through the shell member 34.

The stator electrical output is then routed to electronic board 70, as shown in FIG. 1, which monitors the charge condition of the device to be charged and controls the operation of valve 11 to initiate or terminate the flow of pressurized fluid to the turbine and thus the generating and charging activity.

The generator rotor assembly may be located such that pressurized media does not circulate about the generator rotor, subjecting it to contamination by particles or debris in the media that could be attracted to the magnets on the generator rotor. Locating the support bearing such that the circulating fluid does not flow through or in close proximity to the bearing also minimizes the opportunity for fluid contaminants to enter the bearing. The turbine cavity and the generator rotor cavity may be pressure balanced, such that pressurizing and depressurizing of the generator does not draw fluid media through the bearing which could lead to bearing contamination.

As indicated above, a significant feature of the present invention is the absence of dynamic seals in the generator, thereby allowing reliable operation at high rotational speed (RPMs). A further advantage is the pressure balancing of the bearing, and the fact that flowing fluid does not contact either the inner components of the bearing or the electrical components of the electrical generator, thereby minimizing the likelihood of debris in the pressurized gas contaminating these components.

Figure 4:
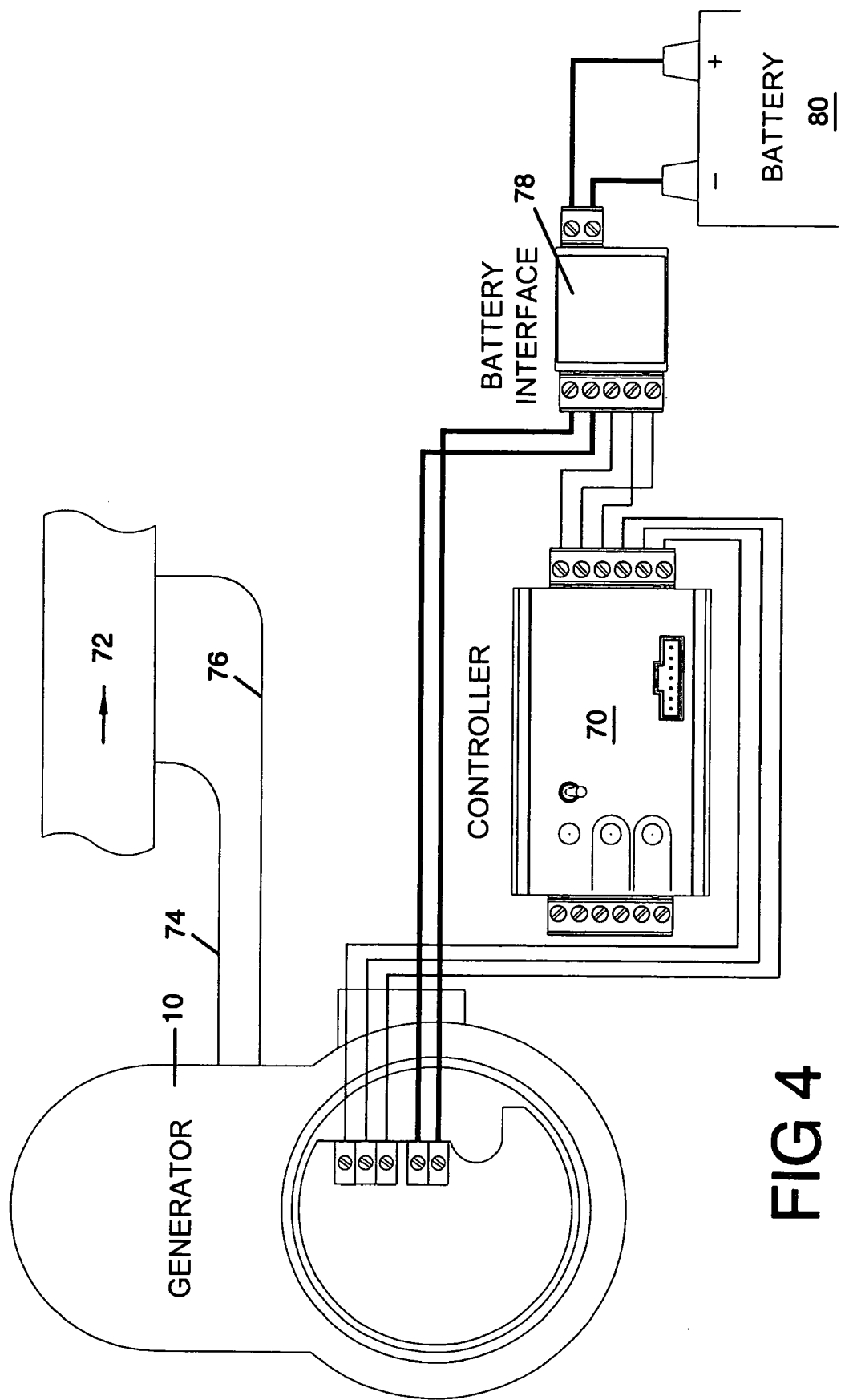
FIG. 4 is an overview of the generator in a natural gas transmission system.

Referring now to FIG. 4, pressure in gas pipeline 72 is supplied to the generator 10 by supply line 74, and is returned to the gas pipeline by a return line 76. Current from the generator is supplied to the controller 70, as previously discussed, and is also forwarded to battery interface 78, which in turn charges battery 80. Battery 80 in turn may be used to power various devices other than the controller 70, including telecommunication devices, warning alarms, and other electrically powered systems common to natural gas pipeline applications.

Although the invention has been particularly described for use in a natural gas pipeline, the generator may be powered by other pressurized fluids passing through a pipeline, with the appropriate changes made to the composition of the various materials, including the seals.

The foregoing disclosure and description of the invention is illustrative and explanatory of preferred embodiments. It would be appreciated by those skilled in the art that various changes in the size, shape of materials, as well in the details of the illustrated construction or combination of features discussed herein may be made without departing from the spirit of the invention, which is defined by the following claims.

What is claimed is:

1. An electrical generator powered by fluid pressure in a flow line, comprising:

a turbine housing containing a rotor having a central axis and turbine blades rotatably secured to the rotor and rotated by fluid from a flow line passing through the turbine housing;
a control valve for selectively controlling fluid pressure from the flow line to the turbine housing;
a control motor for powering the control valve;
a bearing within the turbine housing for guiding rotation of the rotor;
a plurality of magnets each mounted on the rotor;
a cap member having a closure end axially opposite the turbine blades with respect to the bearing and radially outward of the plurality of magnets, the cap member being sealed to the turbine housing and sealing fluid within a cavity formed by the cap member and the turbine housing, at least a portion of the cap member being substantially transparent to a magnetic field;
a stator external of the cap member, such that the plurality of moving magnets create a magnetic field to generate electrical current in the stator; and
a fluid outlet in the turbine housing for exhausting fluid from the turbine housing.

2. An electrical generator as defined in claim 1, wherein the control motor is powered by electrical current from a battery.

3. An electrical generator as defined in claim 1, further comprising:
the cap member is sealed to the turbine housing by one or more static seals.

4. An electrical generator as defined in claim 1, wherein the fluid outlet is opposite to the cap member with respect to the plurality of turbine blades.

5. An electrical generator as defined in claim 1, further comprising:
fluid pressure in the turbine housing acts both above and below the bearing without flowing fluid through the bearing between a radially inward race and a radially outward race of the bearing.

6. An electrical generator as defined in claim 1, further comprising:
one or more batteries charged by electrical current from the stator; and
an electrical control for controlling the control valve as a function of battery charge.

7. An electrical generator as defined in claim 1, wherein the bearing is axially secured with respect to the rotor by engagement of an upper surface of the bearing with the rotor, and by engagement of a lower surface of the bearing with a stop axially fixed to the rotor.

8. An electrical generator as defined in claim 1, wherein the bearing has an outer race axially secured with respect to the rotor by the turbine housing.

9. An electrical generator as defined in claim 1, wherein the rotor includes a circumferentially positioned passageway for passing fluid from below to above the bearing.

10. An electrical generator powered by fluid pressure in the flow line, comprising:
a turbine housing containing a rotor having a central axis and turbine blades rotatably secured to the rotor and rotated by fluid from the flow line passing through the turbine housing;
a bearing within the turbine housing for guiding rotation of the rotor;
a plurality of magnets each mounted on the rotor;
a cap member having a closure end axially opposite the turbine blades with respect to the bearing and radially outward of the plurality of magnets, the cap member being sealed to the turbine housing by one or more static seals and sealing fluid within a cavity formed by the cap member and the turbine housing, at least a portion of the cap member being substantially transparent to a magnetic field;
a control valve for selectively controlling fluid pressure from the flow line to the turbine housing;
one or more batteries charged by electrical current from the stator;
an electrical control for controlling the control valve as a function of battery charge;
fluid pressure in the turbine housing acts both above and below the bearing without flowing fluid through the bearing between a radially inward race and a radially outward race of the bearing; and
a stator external of the cap member, such that the plurality of moving magnets excite stator windings to generate electrical current in the stator.

11. An electrical generator as defined in claim 10, wherein the bearing is axially secured with respect to the rotor by engagement of an upper surface of the bearing with the rotor, and by engagement of a lower surface of the bearing with a stop axially fixed to the rotor; and
the bearing has an outer race axially secured with respect to the rotor by the turbine housing.

12. A method of generating electrical power using fluid pressure in a flow line, comprising:
housing a rotor having a central axis and turbine blades rotatably secured to the rotor within a turbine housing rotated by fluid from the flow line passing through the turbine housing;
guiding rotation of the rotor with a bearing within the turbine housing;
positioning a plurality of magnets each on the rotor;
providing a cap member having a closure plate axially opposite the turbine blades with respect to the bearing and radially outward of the plurality of magnets, the cap member being sealed to the turbine housing and sealing fluid within a cavity formed by the cap member and the turbine housing, at least a portion of the cap member being substantially transparent to a magnetic field;
selectively controlling fluid pressure from the flow line to the turbine housing with a control valve;
powering the control valve with a control motor;
providing a stator external of the cap member, such that the plurality of magnets create a magnetic field to generate electrical current in the stator; and
providing fluid from the flow line into the turbine housing to move the turbine blades and generate electrical energy.

13. A method as defined in claim 12, further comprising:
sealing the cap member to the turbine housing by one or more static seals.

14. A method as defined in claim 12, further comprising:
providing fluid pressure in the turbine housing to act both above and below the bearing without flowing fluid through the bearing between a radially inward race and a radially outward race of the bearing.

15. A method as defined in claim 12, further comprising:
charging one or more batteries by electrical current from the stator; and
controlling the fluid flow to the turbine housing as a function of battery charge.

16. A method as defined in claim 15, further comprising:
axially securing a bearing inner race with respect to the rotor by engagement of an upper surface of the bearing with the rotor and by engagement of a lower surface of the bearing with a stop axially fixed to the turbine housing; and axially securing a bearing outer race with respect to the rotor by the turbine housing.

17. A method as defined in claim 12, further comprising:
providing a circumferentially positioned passageway in a rotor for passing fluid from below to above the bearing.

18. An electrical generator powered by fluid pressure in a flow line, comprising:
   a turbine housing containing a rotor having a central axis and turbine blades rotatably secured to the rotor and rotated by fluid from the flow line passing through the turbine housing;
   a control valve for selectively controlling fluid pressure from the flow line to the turbine housing;
   a bearing within the turbine housing for guiding rotation of the rotor;
   a plurality of magnets each mounted on the rotor;
   a cap member having a closure end axially opposite the turbine blades with respect to the bearing and radially outward of the plurality of magnets, the cap member being sealed to the turbine housing and sealing fluid within a cavity formed by the cap member and the turbine housing, at least a portion of the cap member and the turbine housing being substantially transparent to a magnetic field;
   one or more batteries charged by electrical current from the stator;
   an electrical control for controlling the control valve as a function of battery charge; and
   a stator external of the cap member, such that the plurality of moving magnets create a magnetic field to generate electrical current in the stator.

19. An electrical generator as defined in claim 18, further comprising:
   the bearing being axially secured with respect to the rotor by engagement of an upper surface of the bearing with the rotor, and by engagement of a lower surface of the bearing with a stop axially fixed to the turbine housing.

20. An electrical generator as defined in claim 18, further comprising:
   fluid pressure in the turbine housing acts both above and below the bearing without flowing fluid through the bearing between a radially inward race and a radially outward race of the bearing.

21. An electrical generator as defined in claim 18, wherein the rotor includes a circumferentially positioned passageway for passing fluid from below to above the bearing.

22. An electrical generator powered by fluid pressure in a flow line, comprising:
   a turbine housing containing a rotor having a central axis and turbine blades rotatably secured to the rotor and rotated by fluid from a flow line passing through the turbine housing;
   a control valve for selectively controlling fluid pressure from the flow line to the turbine housing;
   a bearing within the turbine housing for guiding rotation of the rotor, the bearing being axially secured with respect to the rotor by engagement of an upper surface of the bearing with the rotor, and by engagement of a lower surface of the bearing with a stop axially fixed to the rotor;
   fluid pressure in the turbine housing acting both above and below the bearing without flowing fluid through the bearing between a radially inward race and a radially outward race of the bearing;
   a plurality of magnets each mounted on the rotor;
   a cap member having a closure end axially opposite the turbine blades with respect to the bearing and radially outward of the plurality of magnets, the cap member being sealed to the turbine housing and sealing fluid within a cavity formed by the cap member and the turbine housing, at least a portion of the cap member being substantially transparent to a magnetic field; and
   a stator external of the cap member, such that the plurality of moving magnets create a magnetic field to generate electrical current in the stator.

23. An electrical generator as defined in claim 22, further comprising:
   a control motor for powering the control valve.

24. An electrical generator as defined in claim 22, further comprising:
   one or more batteries charged by electrical current from the stator; and
   an electrical control for controlling the control valve as a function of battery charge.

25. An electrical generator as defined in claim 22, wherein the rotor includes a circumferentially positioned passageway for passing fluid from below to above the bearing.

* * * * *